(12) United States Patent
Marck

(10) Patent No.: US 10,162,195 B2
(45) Date of Patent: Dec. 25, 2018

(54) METHOD FOR MANUFACTURING AN OPHTHALMIC LENS AND SAID LENS

(71) Applicant: ESSILOR INTERNATIONAL (COMPAGNIE GENERALE D'OPTIQUE), Charenton-le-Pont (FR)

(72) Inventor: Christelle Marck, Charenton-le-Pont (FR)

(73) Assignee: ESSILOR INTERNATIONAL, Charenton-le-Pont (FR)

(*) Notice: Subject to any disclaimer, the term of this patent is extended or adjusted under 35 U.S.C. 154(b) by 0 days.

(21) Appl. No.: 15/312,840

(22) PCT Filed: May 20, 2015

(86) PCT No.: PCT/FR2015/051333
§ 371 (c)(1),
(2) Date: Nov. 21, 2016

(87) PCT Pub. No.: WO2015/177470
PCT Pub. Date: Nov. 26, 2015

(65) Prior Publication Data
US 2017/0184879 A1 Jun. 29, 2017

(30) Foreign Application Priority Data
May 21, 2014 (FR) ..................... 14 54589

(51) Int. Cl.
*G02C 7/10* (2006.01)
*B29D 11/00* (2006.01)
(Continued)

(52) U.S. Cl.
CPC .............. *G02C 7/107* (2013.01); *B29C 65/48* (2013.01); *B29D 11/00009* (2013.01);
(Continued)

(58) Field of Classification Search
CPC .... G02C 7/107; G02C 2202/16; G02B 1/005; B29C 65/48; B29D 11/0073;
(Continued)

(56) References Cited

U.S. PATENT DOCUMENTS 5,976,424 A 11/1999 Weber et al.
6,117,530 A 9/2000 Jonza et al.
(Continued)

FOREIGN PATENT DOCUMENTS

EP 2030075 3/2009
WO WO1999036248 7/1999
(Continued)

OTHER PUBLICATIONS

Office Action Issued in Corresponding Chinese Application No. 201510257977.6, dated Jul. 12, 2018.

*Primary Examiner* — Tuyen Tra
(74) *Attorney, Agent, or Firm* — Norton Rose Fulbright US LLP

(57) ABSTRACT

The method for manufacturing relates to an ophthalmic lens comprising a substrate and a functional film securely fastened to a curved face of said substrate. This method comprises a method for gluing the functional film, which is initially flat, to said curved face. The interferential and organic filtering film selected as said functional film filters a preset band of wavelengths and the gluing method is carried out so that the maximum of the degree of major deformation experienced by the film on a surface is lower than 3%. In the ophthalmic lens, the wavelength at which maximum filtration is observed at the center of the lens and the wavelength at which maximum filtration is observed at the periphery of the useful area of the lens differ by a less than 5%.

14 Claims, 8 Drawing Sheets

(51) Int. Cl.
*B29C 65/48* (2006.01)
*G02B 1/00* (2006.01)
*B29L 11/00* (2006.01)

(52) U.S. Cl.
CPC .... *B29D 11/0073* (2013.01); *B29D 11/00634* (2013.01); *G02B 1/005* (2013.01); *B29L 2011/0016* (2013.01); *G02C 2202/16* (2013.01)

(58) Field of Classification Search
CPC ........ B29D 11/00634; B29D 11/00009; B29L 2011/0016
USPC ................. 351/159.62, 159.6, 159.01, 41
See application file for complete search history.

(56) References Cited

U.S. PATENT DOCUMENTS

| | | |
|---|---|---|
| 6,531,230 B1 | 3/2003 | Weber et al. |
| 2004/0074261 A1 | 4/2004 | Caron et al. |
| 2005/0043793 A1 | 2/2005 | Pratt |
| 2007/0195262 A1 | 8/2007 | Mosse et al. |
| 2007/0212518 A1 | 9/2007 | Begon et al. |
| 2008/0314499 A1 | 12/2008 | Begon et al. |
| 2010/0007847 A1 | 1/2010 | Cano et al. |
| 2010/0193112 A1* | 8/2010 | Bovet ................. B29C 63/0073 156/196 |
| 2011/0222142 A1 | 9/2011 | Aresenault |
| 2012/0320306 A1 | 12/2012 | Lee et al. |
| 2013/0171438 A1 | 7/2013 | Hayahi et al. |
| 2015/0338685 A1 | 11/2015 | Marck |
| 2017/0038605 A1* | 2/2017 | Legerton .................. G02C 7/02 |

FOREIGN PATENT DOCUMENTS

| | | |
|---|---|---|
| WO | WO2000007046 | 2/2000 |
| WO | WO 2012/080615 | 6/2012 |

* cited by examiner

METHOD FOR MANUFACTURING AN OPHTHALMIC LENS AND SAID LENS

CROSS-REFERENCE TO RELATED APPLICATIONS

This application is a national phase application under 35 U.S.C. § 371 of International Application No. PCT/FR2015/051333 filed 20 May 2015, which claims priority to French Application No. 1454589 filed 21 May 2014. The entire contents of each of the above-referenced disclosures is specifically incorporated by reference herein without disclaimer.

FIELD OF THE INVENTION

The invention relates to the manufacture of ophthalmic lenses that comprise a substrate and a functional film securely fastened to a curved face of said substrate.

TECHNOLOGICAL BACKGROUND

The functional films used to coat ophthalmic lenses are sometimes flat in their initial state, for reasons of ease of manufacture of these films; methods for gluing an initially flat functional film to a curved face of a substrate are already known.

In these methods, to prevent defects appearing in the film, the film is preformed using a cold, or preferably hot (thermoforming), method to give it an appropriate initial curvature, before being applied to the substrate.

In particular, French patent application 2 883 984, to which U.S. 2008/0314499 is the corresponding United States patent application, proposes positioning the substrate having a curved face on a substrate holder inside a chamber; positioning the flat functional film on a film holder at the upper end of the chamber in order to close this chamber; positioning the chamber vertically in line with a flexible buffer so that their respective geometric centres are aligned; preforming the functional film by applying the flexible buffer to the film; creating a negative pressure in the chamber, this negative pressure causing the substrate and the functional film to move so that their respective geometric centres make contact on the curved-face side of the substrate; and translating the flexible buffer vertically so as to establish a conformal contact between the functional film and the substrate on the same side as its curved face.

French patent application 2 918 917, to which U.S. 2010/0193112 is the corresponding United States patent application, proposes to implement a similar gluing method, but in which the direct immobilization of the film by the film holder along an annular perimeter is replaced by immobilisation of an initially flat deformable auxiliary membrane, on one face of which the functional film is retained by a binding layer configured so that the shape of the functional film varies conformally to the deformation of the membrane, the functional film then remaining parallel to the auxiliary membrane, only the auxiliary membrane being held by the film holder at its perimeter, the functional film being held in contact with the auxiliary membrane only by the binding layer.

The implementation of the gluing method described in French patent application 2 918 917 is carried out:
   as in French patent application 2 883 984, i.e. a flexible buffer is used to preform the functional film, giving it a curvature the convexity of which is turned towards the curved face of the substrate; the centre of the convex face of the functional film is brought into contact with the centre of the convex curved face of the substrate; and then the functional film is applied with the flexible buffer by inverting its curvature in order to diffuse radially from the centre of the functional film as far its periphery the conformal contact between the functional film and the substrate; or
   as a variant, a flexible buffer is not used and the negative pressure in the chamber is replaced by a positive pressure that is used to preform the functional film, thereby giving it a curvature the concavity of which is turned towards the curved face of the substrate; the centre of the concave face of the functional film is brought into contact with the centre of the convex curved face of the substrate; and then the film is applied, without inverting its curvature, by driving the substrate towards the film, in order to diffuse radially from the centre of the film as far as its periphery the conformal contact between the functional film and the substrate.

In the gluing method described in French patent application 2 918 917, since the functional film is not held at all at its periphery by mechanical means, it can slide over the membrane while the deformation is generated, thus decreasing the strains that are created in the functional film.

Moreover, it is known that functional films can be used to provide a very wide range of functions, for example an anti-shock function, an anti-scratch function, an anti-reflection function, a polarising function, a colour-filtering function, a photochromic function, an antistatic function or an anti-smudge function.

SUBJECT OF THE INVENTION

The invention aims to provide a method for manufacturing an ophthalmic lens implementing such a gluing method, for the case where the functional film must provide the ophthalmic lens with the ability to filter with particular precision a relatively narrow preset band of wavelengths.

For this purpose, the invention proposes a method for manufacturing an ophthalmic lens comprising a substrate and a functional film securely fastened to a curved face of said substrate, said manufacturing method comprising a method for gluing said functional film, which is initially flat, to said curved face; characterized in that, in order to ensure that said functional film when securely fastened to said curved face is configured to filter a preset band of wavelengths:
   an interferential and organic filtering film is selected as said functional film; and
   the gluing method is carried out so that the maximum of the degree of major deformation experienced by the film on a surface is lower than 3%.

Selecting an interferential and organic film, such as an interferential photonic crystal (PC) filter, a multilayer optical film (MOF) or a cholesteric crystal filter allows a relatively narrow preset band of wavelengths, in particular in the visible spectrum, to be filtered with particular precision.

In the context of the invention, the expression "organic film" will be understood to mean a film composed mainly, for example more than 80%, of organic substances, the film possibly optionally comprising inorganic components taking the form of inorganic colloids or inorganic nanoparticles. The invention particularly applies to interferential organic films comprising only organic substances.

It is known that an interferential photonic crystal (PC) film is for example obtained by depositing an organic layer on a thin film, in particular:

- by self-assembly of organic colloidal particles (core-shell structure in a matrix) forming a layer deposited on a film made of plastic (PET or TAC for example), such as for example described in United States patent application U.S. 2013/0171438; or
- by periodic structuring of an organic layer, such as for example described in United States patent application U.S. 2011/0222142.

Multilayer optical films (MOFs) are well known and may be obtained from the American company 3M or from the Japanese company DUPONT-TEIJIN and are for example described in the U.S. Pat. No. 6,531,230, in international patent application WO 00/07046, in the U.S. Pat. No. 5,976,424, in international patent application WO 99/36248 and in the U.S. Pat. No. 6,117,530.

Cholesteric crystal filters, also known as chiral nematic filters, comprise a stack of layers composed of the same material. In each layer, a nematic order exists. Between two layers, the direction of the nematic order changes depending on the nature of the material. A rotation of 360° of this direction of the nematic order is obtained for a precise thickness of material, defining a characteristic length. These filters have orders in two directions. Such filters are illustrated in United States patent application U.S. 2012/0320306.

Because the layers are organic in nature, they are able to withstand a certain degree of deformation, this being advantageous since the gluing method engenders a deformation of the layers during the preforming operation.

It will be noted that the invention is partially based on the observation that, in contrast, mineral interferential films, although they also allow a relatively narrow preset band of wavelengths to be filtered with particular precision, are not suitable for implementing the gluing method. Specifically, when deformed, mineral layers have a tendency to crack, even when deformed by only a small amount, for example by less than 1%.

It is known that interferential filters are based on the fact that in an ordered system (whether the order is one-dimensional as for MOFs, two-dimensional as for cholesteric crystals or three-dimensional as for CPs) Bragg's law indicates that a wave of a particular wavelength striking this system will be completely reflected. If the order in the material is not perfect, the reflection will be partial, but always centered on a particular wavelength.

The relationship between the reflected wavelength λ and the characteristic distance (correlation length) of the material, for an order of diffraction limited to the first order is:

$$2dn \sin(\theta) = \lambda$$

where θ is the angle of incidence on the material, d the characteristic distance of the material and n the refractive index of the material.

If θ=90°, given that sin(90°)=1, the following relationship is obtained:

$$\lambda = 2dn$$

Thus, if a material is deformed, its characteristic length varies and the selected wavelength also varies.

For example, if d varies by 1%, then λ must also vary by 1% (at constant index the relationship is linear).

Apart from the above observation regarding the advantages of the organic layers, the invention is also based on the observation that, at least for certain films of one-dimensional order, such as MOFs, and three-dimensional order, such as CPs, unexpectedly, contrary to Bragg's law, the relationship between the variation in d and the measured degree of deformation is not linear but exhibits a threshold effect.

Specifically, it has been observed that, if the maximum of the degree of major deformation experienced by such a film on a surface remains lower than 3%, the transmission spectrum of the film is not modified.

Therefore, provided that the maximum degree of deformation experienced by the film when the gluing method is carried out (between the flat initial state of the film and its curved state securely fastened to the curved face of the substrate) remains lower than 3%, the filtering properties of the film are preserved, i.e. there is no significant change in the levels of transmission through the film. In a graph the x-axis of which is wavelength and the y-axis of which is the level of transmission through the film, the locations and shapes of the filtering peaks of the initially flat film and of the curved film securely fastened to the curved face of the substrate superpose.

Because the filtering properties of the film are preserved, the manufacturing method according to the invention is particularly simple and easy to implement.

The manufacturing method according to the invention furthermore allows particularly high-performance ophthalmic lenses to be manufactured, especially because of the uniformity of the filtration properties over the entire ophthalmic lens.

According to advantageous features:
said functional film has a three-dimensional order, with an organic layer preferably formed by photonic crystals; or said functional film has a one-dimensional order, preferably with a multilayer of a plurality of organic films;
said functional film at least partially filters light having a wavelength comprised between 400 nm and 460 nm and preferably between 415 nm and 450 nm;
said functional film filters at least 20%, preferably at least 30% and very preferably at least 50% of the light having a wavelength comprised between 400 nm and 460 nm and preferably between 415 and 450 nm;
the maximum of the degree of major deformation experienced by the film on a surface is lower than 3%, preferably lower than 2% and very preferably lower than 1.5%;
the maximum of the degree of major deformation experienced by the film on a surface is higher than 1%;
the gluing method comprises steps of:
i) preforming said functional film to give it a curvature;
ii) bringing the centre of the convex face of said functional film into contact with the centre of the curved face (SI) of said substrate; and
iii) then applying said functional film in order to diffuse radially from the centre of the film as far as its periphery the conformal contact between said film and said substrate; and/or
said steps i), ii) and iii) are implemented with said functional film, which forms part of a stratified structure comprising an auxiliary membrane and a binding layer between said functional film and said auxiliary membrane, only said auxiliary membrane being immobilized peripherally.

The invention also relates, in a second aspect, to an ophthalmic lens capable of being obtained with the method described above, comprising a substrate and a functional film securely fastened to a curved face of said substrate, said functional film being configured to filter a preset band of wavelengths in its initially flat state, characterized in that the wavelengths at which maximum filtration is observed at the centre of the lens and the wavelengths at which maximum filtration is observed at the periphery of the useful area of the lens differ by less than 5%.

As indicated above, the manufacturing method described above allows ophthalmic lenses having particularly uniform filtration properties over the entire ophthalmic lens, and especially an ophthalmic lens having the features just described, to be obtained.

According to advantageous features:
the wavelengths at which said filtration maxima are observed are each comprised between 400 nm and 460 nm and preferably between 415 and 450 nm; and/or
each of said maximum filtrations is higher than 20%, preferably higher than 30% and very preferably higher than 50%.

BRIEF DESCRIPTION OF THE DRAWINGS

The demonstration of the invention will now continue with a detailed description of embodiments thereof, given below by way of illustration and nonlimiting example, and with reference to the appended drawings, in which.

DETAILED DESCRIPTION OF EMBODIMENTS

Figure 1:
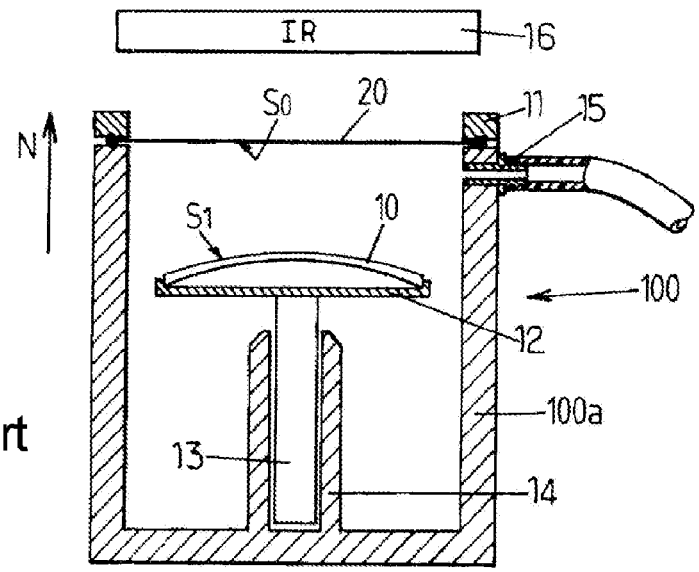
FIG. 1 is a schematic elevated cross-sectional view of a known device for implementing a known method for gluing a functional film, which is initially flat, to a curved face of a substrate in order to manufacture an ophthalmic lens comprising this substrate and this functional film securely fastened to this curved face.

The known gluing device illustrated in FIG. 1 comprises a chamber 100, for example of cylindrical shape and of vertical axis, with an opening in its top face. A lateral wall 100a of the chamber 100 is equipped, at its top end, with a system for attaching an initially flat stratified structure 20 comprising an initially flat functional film, the surface S0 of which is to be applied to the curved face S1 of a substrate 10, in order to manufacture an ophthalmic lens comprising the substrate 10 and the functional film securely fastened via its face S0 to the curved face S1 of the substrate 10.

The structure 20 comprises, apart from the initially flat functional film, an initially flat auxiliary membrane that is larger in size than the functional film, and a binding layer, for example a viscoelastic adhesive layer, between the functional film and the auxiliary membrane.

The system for attaching the structure 20 serves to close the chamber 100 hermetically. This attaching system comprises a sealing member such as, for example, an O-ring that is intended to be compressed by an attaching ring 11, between the lateral wall 100a and a peripheral edge of the auxiliary membrane of the structure 20, using clamping members (not shown), screws for example.

In the chamber 100 is placed a holder 12 able to hold the substrate 10. The holder 12 is placed at the end of a rod 13 engaged in a cylinder 14 so as to allow the holder 12 to rise inside the chamber 100, beyond the level of the attaching ring 11.

The movement of the holder 12, by way of the rod 13 and of the cylinder 14, is controlled, from outside the chamber 100, using an electrical or hydraulic control unit for example. Such a remote control unit is assumed to be known and is not described here.

The chamber 100 is provided with an orifice 15 that is connected by an appropriate duct to an external gas source (not shown). This source allows a controlled pneumatic pressure to be established inside the chamber 100.

Thus, relative to the ambient pressure that exists outside of the chamber 100, a positive or a negative pressure may be generated in the interior of the chamber 100. The pressure in the chamber 100 may be varied and controlled independently of the position and movement of the holder 12.

In other words, the pressure in the chamber 100 and the position of the holder 12 are adjusted by separate commands.

Lastly, a heating system 16 is placed above the chamber 100, facing its closing member, i.e. the structure 20.

An infrared radiative heating system is particularly simple and rapid to use, but other heating systems may alternatively be used.

Advantageously, the heating system 16, the pressure inside the chamber 100 and the position of the holder 12 are controlled by a programmable logic controller, which allows the various parameters of the device to be varied in sequence, in order to implement a gluing method.

The substrate 10 is installed on the holder 12 with the face S1 turned upwards. The holder 12 is then lowered to a low position inside the chamber 100.

The structure 20 is attached to the chamber by means of the ring 11, with the face S0 of the functional film turned towards the interior of the chamber, in accordance with the oriented direction N that is indicated in FIG. 1.

In this configuration, the face S1 of the substrate 10 is located a distance below the face S0 of the functional film; and the chamber 100 is hermetically closed by the structure 20.

In a first step, the pressure inside the chamber 100 is increased, so as to create a pneumatic pressure difference $\Delta P_1$ between the two sides of the structure 20, which is comprised between 0.1 bar and 4.0 bars and preferably between 0.1 bar and 1.0 bar.

The pressure outside the chamber 100 is atmospheric pressure and the pressure in the chamber 100 is positive. In this step, the structure 20 is heated by means of the system 16, in order to make the structure 20 more flexible, more plastic and more extendable. The temperature $T_1$ of the structure 20 is then comprised between 80° C. and 185° C. Optionally, it may be advantageous to heat the structure 20 before increasing the pressure in the chamber 100, and to continue the heating in order to maintain the temperature of the structure 20 while the pressure in the chamber 100 is increased.

Figure 2:
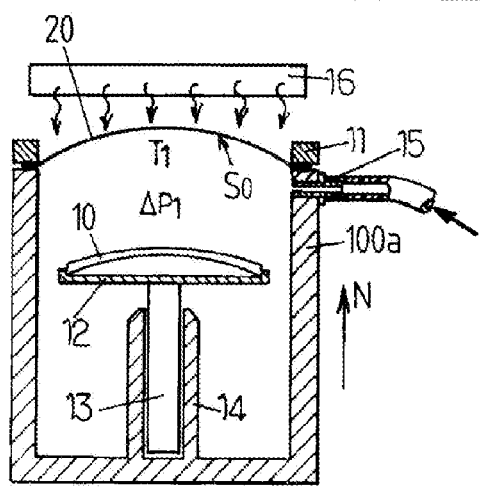
FIGS. 2 to 5 are similar views to FIG. 1, showing various successive steps of this gluing method.

The structure 20 then takes a substantially spherical shape as it is inflated towards the exterior of the chamber 100, as illustrated in FIG. 2.

The heating of the structure 20 is then stopped and the temperature of the structure 20 is brought back to a value substantially equal to the ambient temperature $T_0$, which is comprised between 10° C. and 40° C.

Figure 3:
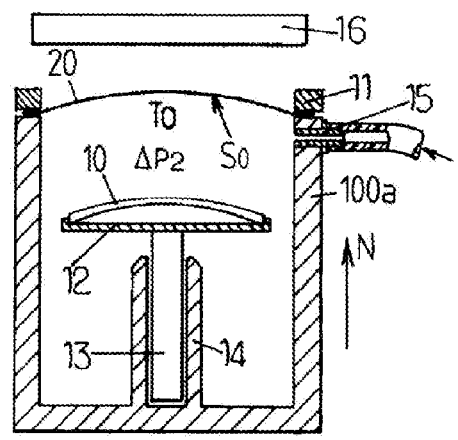

In a second step, the pressure inside the chamber 100 is decreased, if needs be (the pressure could already be the required pressure), to obtain a pneumatic pressure difference $\Delta P_2$ between the two sides of the structure 20 such that the radius of curvature of the structure 20 becomes a little larger than the radius of curvature of the convex face S1 of the substrate 10 (FIG. 3).

This first step and the second step constitute an operation for preforming the structure 20, to a curvature value that is intermediate between the initially zero curvature of the structure 20 and the curvature of the face S1 of the substrate 10. In the present case, this preforming operation is a thermoforming operation.

In a third step, the holder 12 is raised so that the face S1 of the substrate 10 is brought into contact with the face S0 of the structure 20.

Figure 4:
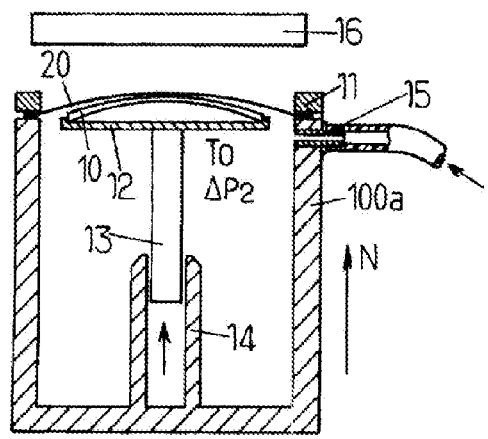

Because of the respective radii of curvature of the two faces S0 and S1, contact occurs first at the centre of the substrate 10 (FIG. 4), then extends radially as the holder 12 continues to rise. The face S1 of the substrate 10 then pushes the structure 20 towards the exterior of the chamber 100, beyond the position of the structure 20 before the holder 12 was raised.

The face S1 of the substrate 10 is thus gradually brought to bear against the face S0 of the functional film of the structure 20, with a relative speed of movement that may be comprised between 0.1 and 1.0 mm/s. The limiting upper value of this speed depends on the plastic behaviour of the structure 20.

Figure 5:
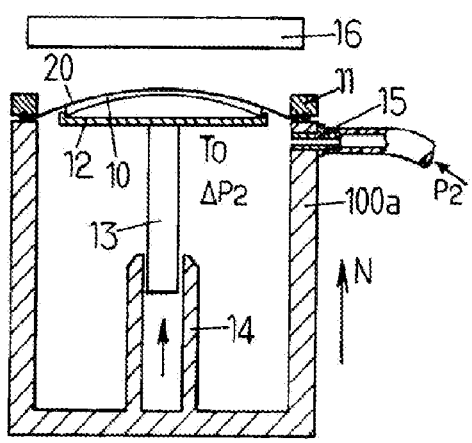

In this way, the functional film takes the shape of the face S1, without forming creases or tearing (FIG. 5) and with a minimized degree of deformation. In this third step, the temperature of the structure 20 is constant, remaining equal to the ambient temperature for example. The substrate 10 may be held pressed against the film of the structure 20 for a waiting period that may be comprised between 0.5 seconds and 2 minutes.

The positive pressure in the chamber 10 is then relaxed and the attaching ring 11 is removed.

The substrate 10 is then recovered with the functional film of the structure 20 securely fastened to the face S1. The secure fastening is obtained by virtue of an adhesive layer present on the face S0 of the functional film of the structure 20 or on the face S1 of the substrate 10 or even on both the face S0 and on the face S1.

Figure 6:
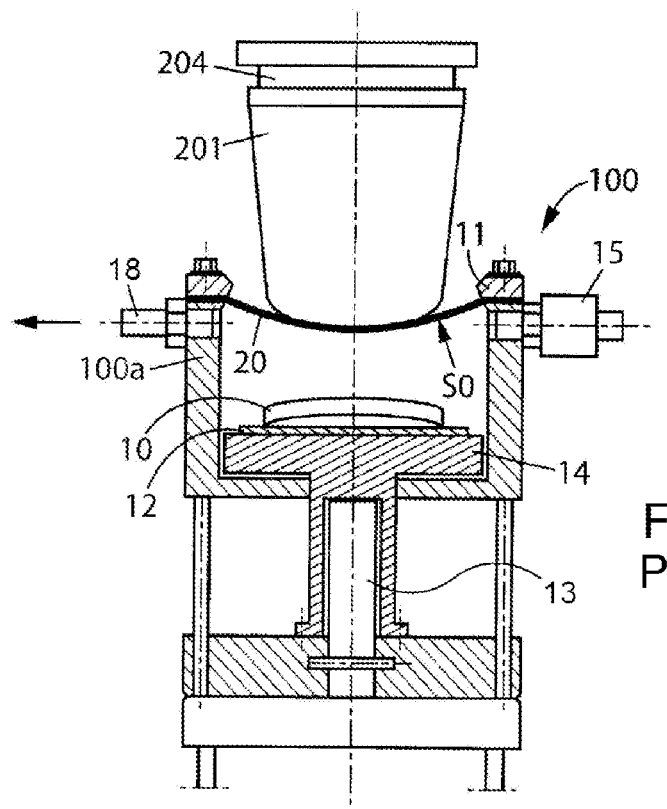
FIG. 6 is a schematic elevated cross-sectional view of a known device similar to that illustrated in FIGS. 1 to 5 but furthermore comprising a buffer application system.
Figure 7:
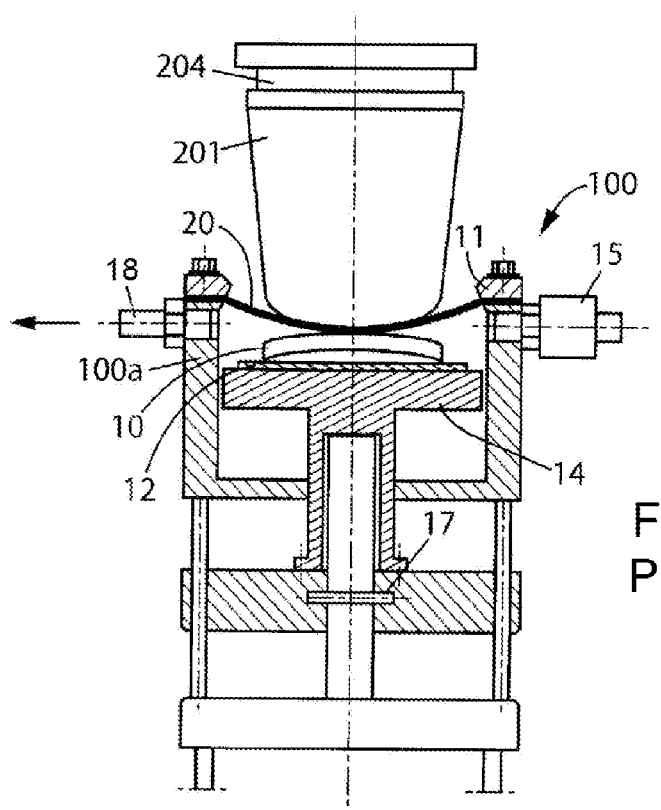
FIGS. 7 and 8 are similar views to FIG. 6 but showing successive steps of the known gluing method implemented with the device in FIG. 6.
Figure 8:
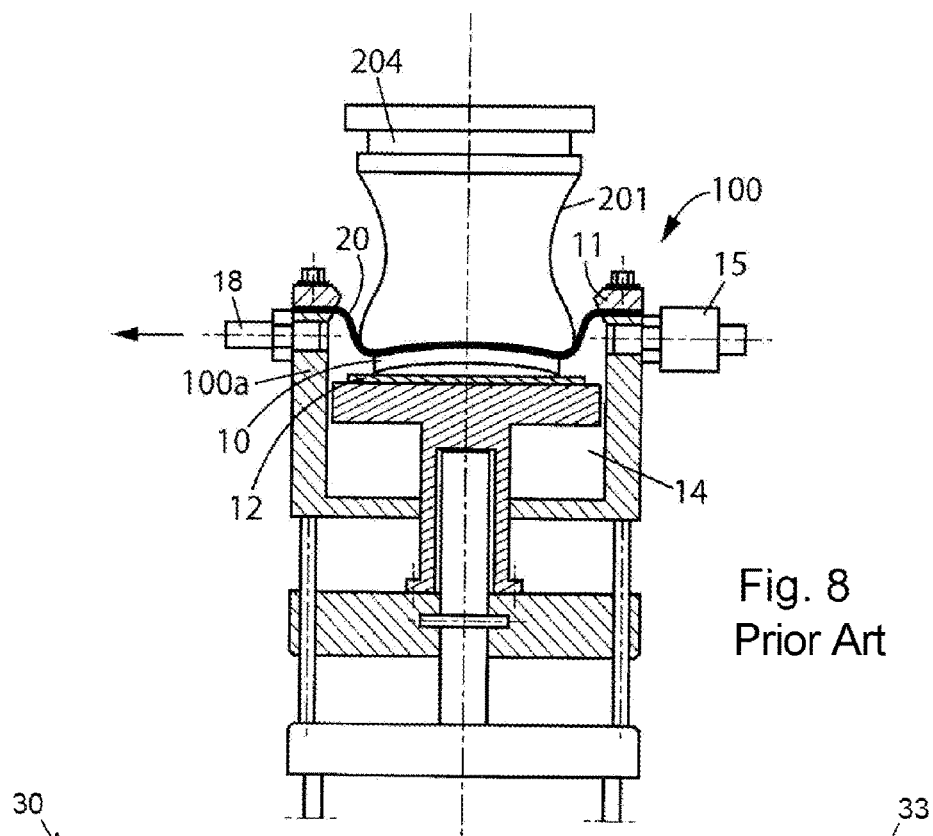

The known device illustrated in FIGS. 6 to 8 is similar to that illustrated in FIGS. 1 to 5, except that it comprises, in addition to the chamber 100, an application system that comprises a buffer 201; and except that the rod 13 is stationary and it is the cylinder 14 that is able to move and that bears the holder 12; and except that the pneumatic means with which the chamber interacts are configured to generate a negative and/or positive pressure therein.

Thus, the wall 100a is equipped, in addition to the gas inlet orifice 15, with a suction orifice 18 connected to a pumping unit (not shown).

A blocking system 17 (FIG. 7) allows the height of the cylinder 14 and therefore of the holder 12 to be fixed.

The buffer 201 forms part of an application system that comprises vertical slide rails, on which the buffer 201 is mounted, and a system for moving the buffer 201, for example comprising a step motor that drives a translational screw.

A pressure detector 204, which may comprise a piezoelectric element, allows the application force of the buffer 201 against the structure 20 to be measured.

In a first step (FIG. 6), the buffer 201 is lowered so as to push a central portion of the structure 20 towards the interior of the chamber 100. Given that the structure 20 is firmly held on its periphery by the ring 11, it is deformed and takes a curved shape, which corresponds to that of the bottom end of the buffer 201. This first step constitutes an operation of preforming the structure 20, so that the latter may then be applied evenly to the curved face S1 of the substrate 10.

In a second step (FIG. 7), the substrate 10 is brought closer to the structure 20 by creating a negative pressure therebetween, inside the chamber 100. The cylinder 14 rises as a gas initially present in the chamber is pumped out via the orifice 18. The pumping is stopped when a point of contact is obtained between the structure 20 and the face S1 of the substrate 10. The height of the cylinder 14 is then fixed by means of the blocking system 17.

Lastly, in a third step (FIG. 8), the buffer 201 is lowered once more thereby pressing it against the structure 20, on the side of the latter that is opposite the substrate 10. In this way, the structure 20 is applied to all of the face S1 of the substrate 10.

The end of the buffer 201 preferably consists of a flexible and deformable material, so as to obtain a regular application of the structure 20 to all the substrate 10. The structure 20 is thus pushed by the buffer 201 against all the face S1.

The ring 11 is then released and the buffer 201 raised.

As in the device illustrated in FIGS. 1 to 5, the substrate 10 is then recovered with the functional film of the structure 20 securely fastened to the face S1. The secure fastening is obtained by virtue of an adhesive layer present on the face S0 of the functional film of the structure 20 or on the face S1 of the substrate 10 or even on both the face S0 and on the face S1.

Once the functional film of the stratified structure 20 has been glued to the face S1 of the substrate 10, the auxiliary membrane of the stratified structure 20 is removed, thereby provoking rupture of the binding layer between the functional film and the auxiliary membrane, such a separation for example being carried out by peeling.

For more details on the gluing methods and devices and on the arrangement of the stratified structure 20 illustrated in FIGS. 1 to 8, the reader may consult the aforementioned French patent application 2 918 917.

Figure 9:
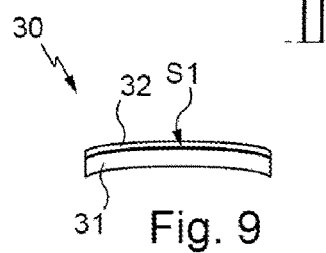
FIG. 9 is a schematic elevated view of an optical lens according to the invention, comprising a substrate on a curved face of which a functional film configured to filter a relatively narrow preset band of wavelengths is securely fastened.

FIG. 9 shows an ophthalmic lens 30 comprising a substrate 31 having a curved face S1 and a functional film 32 configured to filter a relatively narrow preset band of wavelengths.

The substrate 31 and the functional film 32 have been securely fastened to each other with a gluing method that will now be described.

Here, the substrate 31 and the functional film 32 form the ophthalmic lens 30 at the end of this gluing method. As a variant, the ophthalmic lens 30 is obtained after other manufacturing operations, for example operations of machining, treating the surface of and/or coating that face of the substrate 31 which is opposite the face S1 to which the functional film 32 is securely fastened.

Figure 10:
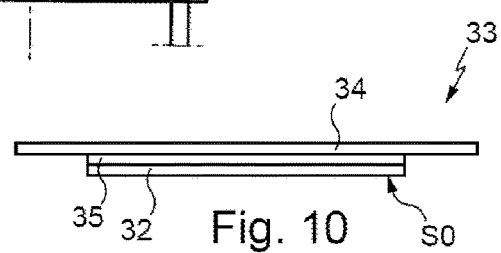
FIG. 10 is a schematic cross-sectional view showing, in its initial flat state, the stratified structure that allows the functional film of the lens in FIG. 9 to be glued to one of the curved faces of its substrate, this stratified structure comprising this functional film, in its initial flat state, an auxiliary membrane and a binding layer between the auxiliary membrane and the functional film.

To glue the functional film 32 to the substrate 31, the stratified structure 33 shown in FIG. 10 is first prepared, this structure 33 comprising, just like the structure 20 implemented with the device shown in FIGS. 1 to 5 or the device shown in FIGS. 6 to 8, an auxiliary membrane 34 and a viscoelastic adhesive layer 35 for binding the auxiliary membrane 34 and the functional film, here the film 32.

Generally, the functional film 32 is glued to the face S1 of the substrate 31 with a device similar to that shown in FIGS. 1 to 5 but furthermore comprising an application buffer such as the buffer 201 of the device illustrated in FIGS. 6 to 8.

After a step similar to that shown in FIGS. 1 and 2 has been implemented, the chamber 100 is returned to atmospheric pressure.

This first step constitutes an operation for preforming the stratified structure 33, to a radius of curvature value that is lower than the radius of curvature of the face S1 of the substrate 10. In the present case, this preforming operation is a thermoforming operation.

In a second step, an application buffer such as the buffer 201 is used to make contact with the convex face of the structure 33 (located on the side opposite the functional film 32), and when the application buffer such as 201 advances towards the substrate 31 placed on the holder 12, the concavity of the stratified structure 33 inverts, i.e. the face making contact with the buffer such as 201 becomes concave (and the face S0 of the film 32 becomes convex).

The stratified structure 33 then has a curved shape that corresponds to that of the bottom end of the buffer such as 201. The geometry of this buffer is configured to be suitable for gluing films 32 to the surface S1 of the substrate 31.

Next, the substrate 31 is brought closer to the stratified structure 33 until a point of contact is obtained between the stratified structure 33 and the face S1 of the substrate 31.

Next, the rising of the holder such as 12 is accompanied by the lowering and squashing of the buffer such as 201. Thus, the face S0 of the functional film 32 is applied to all the face S1 of the substrate 31, in the way shown in FIGS. 7 and 8.

It may be seen that during the application of the functional film 32 to the curved face S1 of the substrate 31, the conformal contact between the film 32 and the substrate 31 is diffused radially from the centre of the film 32 as far as its periphery.

The ring 11 is then released and the buffer such as 201 is raised.

The substrate 31 is then recovered with the functional film 32 securely fastened to the face S1. The secure fastening is obtained by virtue of an adhesive layer present on the face S0 of the functional film 32 or on the face S1 of the substrate 31 or even on both the face S0 and the face S1.

Once the film 32 of the stratified structure 33 has been glued to the face S1 of the substrate 31, the auxiliary membrane 34 is removed, thereby provoking rupture of the binding layer 35 between the functional film 32 and the auxiliary membrane 34, such a separation for example being carried out by peeling.

In the illustrated example, the curved face S1 of the substrate 31 is convex. As a variant, the curved face S1 is concave, the buffer such as 201 then having at its distal end a corresponding geometry.

One way that may be used to measure the distribution of the deformation experienced by the face S0 of the functional film between the flat initial state and the glued state after it has been glued to the curved face S1 of the substrate 31 will now be described.

Figure 11:
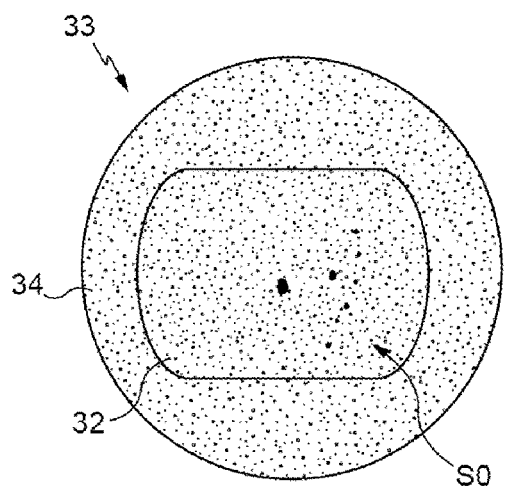
FIG. 11 is a plan view of the stratified structure shown in FIG. 10.

As may be seen in FIG. 11, which shows the stratified structure 33 from the side of the face S0, i.e. the side oriented downwards in FIG. 10, the face S0 of the functional film 32, and that face of the auxiliary membrane 34 which is located on the same side, is covered with a random dappling consisting of small droplets of black paint.

Of course, this dappling is used exclusively to characterize the behaviour of the functional film 31 in the context of studies carried out before production of lenses such as the lens 30 (an ophthalmic lens cannot comprise such a dappling).

To measure the distribution of the deformation experienced by the face S0 of the functional film 32 covered with the dappling, a system comprising an image capturing device is used, said device comprising two cameras that take separate images in order to allow a three-dimensional reconstruction to be produced, and a software package for analysing the images provided by the cameras. Here, the stereocorrelation image measurement system sold under the trade name ARAMIS by the company GOM is used.

Figure 12:
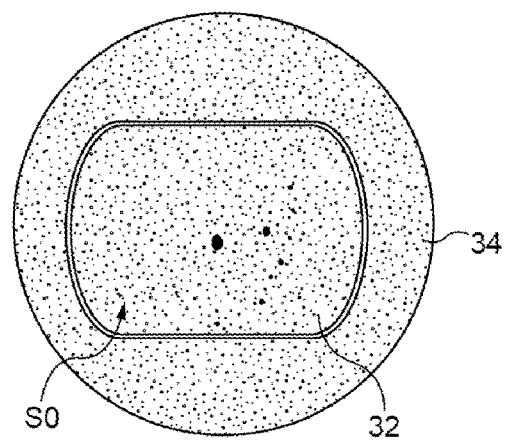
FIG. 12 is a similar view to FIG. 11 but showing the stratified structure after the functional film has been glued to the curved face of the substrate.

FIG. 12 shows, in the same way as FIG. 11, the stratified structure 33 once the functional film 32 has been glued to the face S1 of the substrate 31.

It may be seen that, because of the deformation, there is around the film 32 a white border (without dappling) due to slip, during the deformation, between the functional film 32 and the auxiliary membrane 34.

Figure 13:
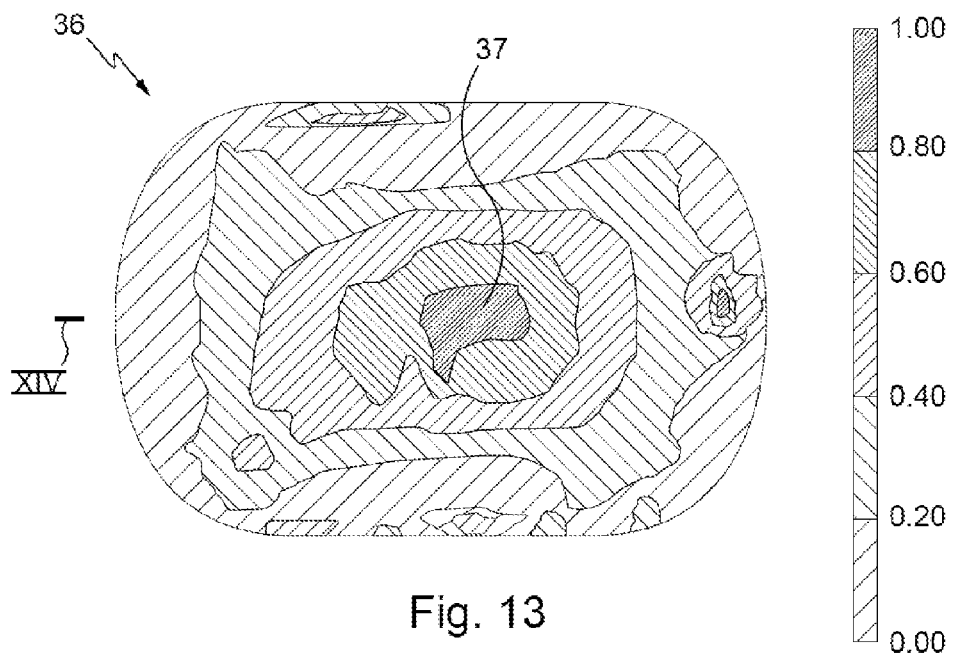
FIG. 13 is a representation of the degrees of major deformation measured on the surface of the functional film on the substrate side.

FIG. 13 shows the deformation experienced by the face S0 of the film 32 during the gluing method. It may be seen that it is possible to characterize this deformation as soon as the preforming step has finished (step similar to that illustrated in FIGS. 1 and 2 followed by return of the chamber such as 100 to atmospheric pressure). Specifically, it has been verified that no additional deformation occurs in subsequent steps of the gluing method, and in particular in the step of applying the film 32 to the face S1 of the substrate 31.

The representation of this deformation, given in FIG. 13 in the form of a map 36, was obtained by the aforementioned deformation measurement system, by virtue of comparison of the images taken, by the two cameras, of the face S0 of the film 32 in the flat initial state and in the glued state after it has been glued to the face S1 of the substrate 31.

By virtue of the presence of the two cameras, it is possible to quantify the movement of the surface of the face S0 in the three directions of space.

Thus, three components of the deformation, denoted E1, E2 and E3 are obtained. Assuming the materials in question are incompressible E1+E2+E3=0.

At each point, E1 is the major deformation, expressed in a direction of space such that the deformation is maximal for the material.

E2 is the secondary deformation, i.e. the component of the deformation in a direction such that the tensor of the deformation is diagonal (direction transversal to the direction of the deformation values E1).

E3 corresponds either to a thickening (positive value) or to a thinning (negative value of the material assumed to be incompressible).

The values shown in FIG. 13 are the values of the deformation component E1, i.e. the major deformation values.

The deformation scale shown on the right of FIG. 13 is in %.

It may be seen that the deformation is maximal in a central zone 37 of the face S0 of the functional film 32; and that, except for certain local zones, the deformation decreases towards the edge of the functional film 32.

Figure 14:
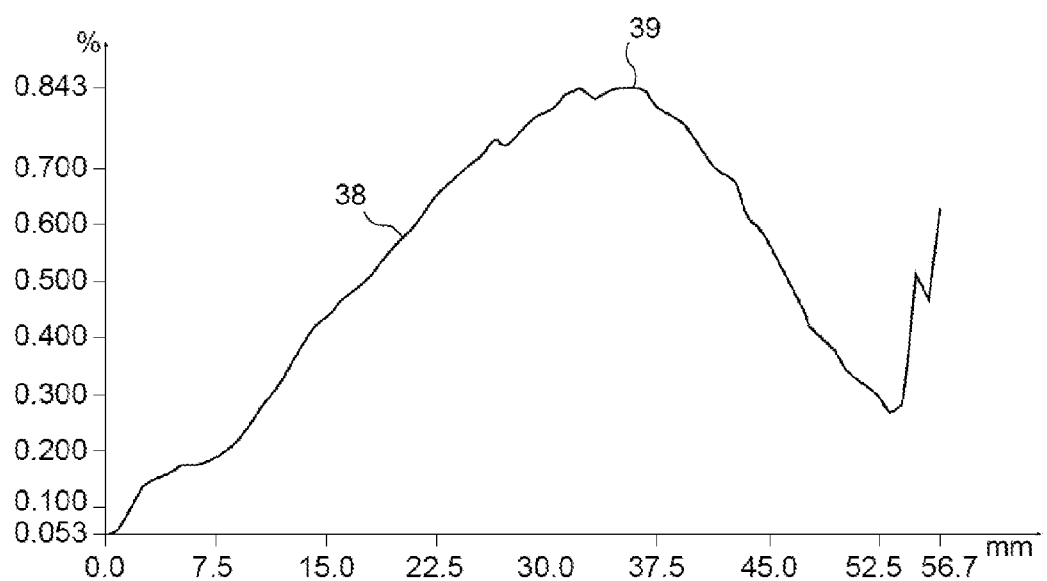
FIG. 14 is a graph containing a curve giving the degrees of major deformation (indicated on the y-axis) as a function of distance along the line XIV in FIG. 13 (indicated on the x-axis)

FIG. 14 is a graph the x-axis of which represents distance along the line XIV in FIG. 13 and the y-axis of which represents the degree of major deformation. Thus, the curve 38 gives the degree of major deformation as a function of distance along the line XIV, i.e. the distance along this line relative to an origin, which here is located on the intersection between the line XIV and the edge of the film 32 on the side located to the left in FIG. 13.

It may be seen that the peak 39 of the curve 38 corresponds to a degree of major deformation of about 0.8%.

Figure 15:
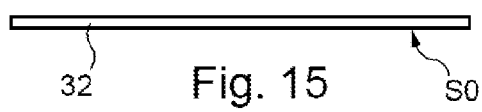
FIG. 15 is a similar view to FIG. 10 of a functional film identical to that of the structure in FIG. 10 and having the same dimensions as the auxiliary membrane of the structure in FIG. 10.

FIG. 15 shows a functional film 32 identical to the functional film 32 of the stratified structure 33, and having the same dimensions as the auxiliary membrane 34.

This film 32 was glued to the curved face S1 of a substrate 31 identical to the substrate 31 of the lens 30 shown in FIG. 9 using the same gluing method, except only the film 32 rather than the stratified structure 33 was glued.

Thus, it was the film 32 directly that was retained on the periphery by the attaching ring 11.

Figure 16:
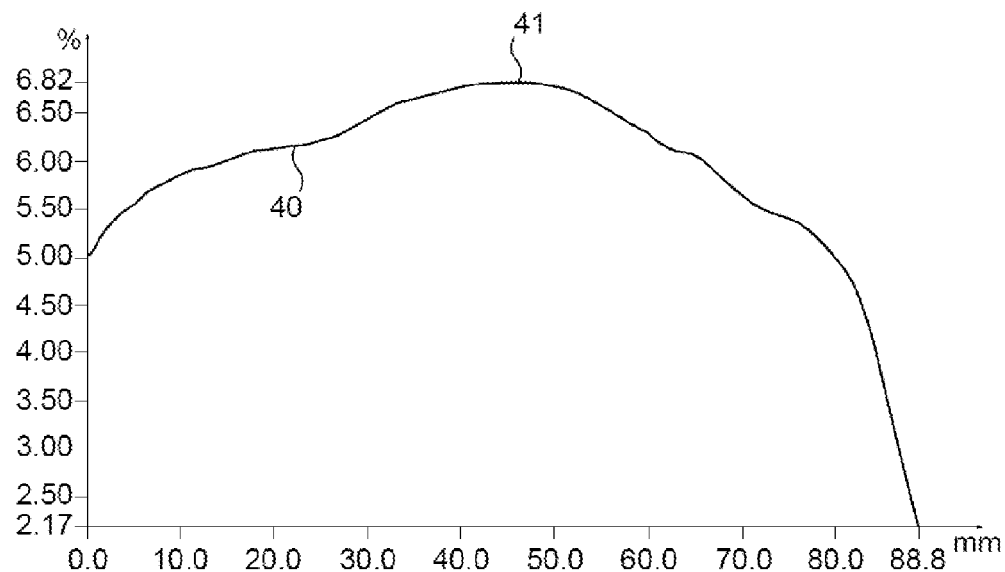
FIG. 16 is a graph similar to FIG. 14 but for the functional film in FIG. 15 after it has been glued to an identical curved face using a gluing method that is identical except for the fact that the structure in FIG. 10 has been replaced by the film in FIG. 15.

FIG. 16 is a graph similar to FIG. 14, but for the film 32 shown in FIG. 15 after it has been glued in this way to the curved face S1 of the substrate 31.

By examining the curve 40 in FIG. 16, it may be seen that the peak 41 of this curve, i.e. the maximum degree of major deformation, is about 6.8%.

Generally, the degrees of major deformation given by the curve 40 are much higher than the degrees of major deformation given by the curve 38.

It will be recalled here that the curve 38 corresponds to the film 32 for which the gluing method was implemented with the stratified structure 33 shown in FIG. 10, offering a possibility of slip during the preforming; and that the curve 40 corresponds to the film 32 shown in FIG. 15, for which the gluing method was implemented directly on the film 32, held on its periphery.

Figure 17:
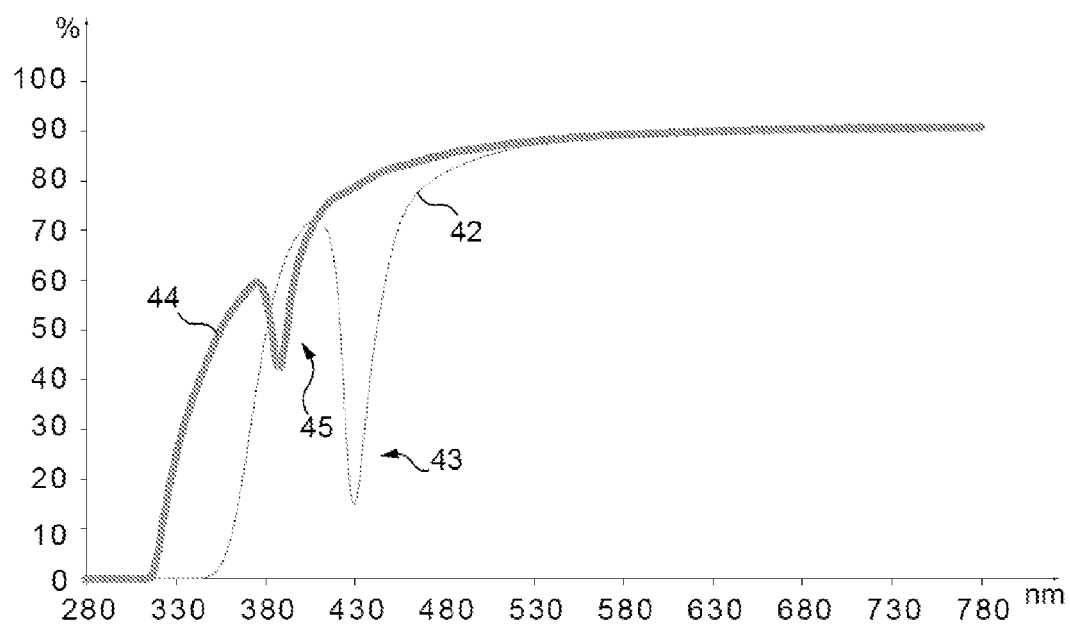
FIG. 17 is a graph containing curves each giving degrees of transmission (indicated on the y-axis) as a function of wavelength (indicated on the x-axis) through identical functional films glued to identical curved faces; a first curve, thin line, corresponding to the functional film of the lens in FIG. 9, and a second curve, thick line, corresponding to the functional film in FIG. 15, glued as was just described with regard to FIG. 16, respectively.

FIG. 17 is a graph the x-axis of which represents wavelengths of light and the y-axis of which represents the degree of transmission through the lens 30 or through a similar lens comprising the film 32 shown, in the flat initial state, in FIG. 15.

The curve 42 in FIG. 17 corresponds to the lens 30 shown in FIG. 9.

As may be seen, the curve 42 comprises a peak 43 such that the film 32 of the lens 30 in FIG. 9 confers on this lens the capacity to filter a relatively narrow band of wavelengths centered on the wavelength of 430 nm.

The wavelength exhibiting the maximum filtration is defined by the wavelength at which the peak 43 presents its extremum: here 430 nm.

The degree of attenuation of the film 32 is defined by the fraction of light filtered for the wavelength of maximum filtration: here about 85%.

It should be noted that the light filtered corresponds to the full width in wavelength at half-maximum of the peak 43: here the light is filtered from about 415 nm to about 450 nm; and in this wavelength range the light transmission is lower than 50%.

It will be recalled here that, as described with regard to FIG. 14, the film 32 of the lens 30 in FIG. 9 exhibits a maximum degree of major deformation of about 0.8%.

It will be noted that the curve 42 is identical or almost identical to the corresponding curve of the film 32 in the flat initial state.

The curve 44 in FIG. 17 corresponds to the lens similar to the lens 30 comprising the film 32 shown, in the flat initial state, in FIG. 15.

As may be seen, the curve 44 comprises a peak 45 such that the film 32 of this lens confers thereon the capacity to filter a relatively narrow band of wavelengths centered on the wavelength of 394 nm.

It will be noted that the film 32, in the flat initial state, is configured to filter a relatively narrow band of wavelengths centered on the wavelength of 430 nm.

It will be recalled here that, as described with regard to FIG. 16, the film 32 to which the curve 44 relates exhibits a maximum degree of major deformation of about 6.8%.

It may be seen that the degree of attenuation given by the peak 45 of the curve 44 is about 60% whereas the degree of attenuation given by the peak 43 of the curve 42 is about 85%.

This modification in performance is related to the deformation experienced by the film 32, the arrangement of which, which is three-dimensional in order as explained below, becomes less regular.

How the functional film 32 of FIG. 10 or FIG. 15 is arranged will now be described with reference to FIG. 18.

The functional film 32, which is an interferential photonic crystal (PC) filter is produced by depositing an organic layer 51 on a thin supporting film 50.

Here, the organic layer 51 is formed by self-assembly of organic colloidal particles (core/shell structure in a matrix) to form a layer of about 25 μm in thickness; and the thin supporting film 50 is made of plastic (PET or TAC) of about 80 μm in thickness.

The film 32 may be obtained in the way for example described in United States patent application U.S. 2013/0171438.

Figure 19:
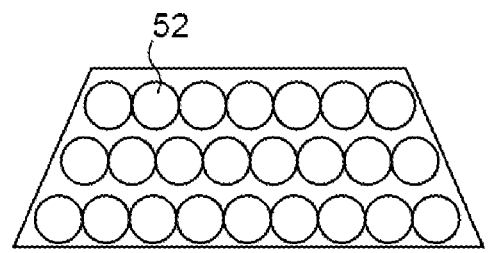
FIG. 19 shows a variant of the photonic crystal layer of the functional film.

As a variant, the organic layer 51 is replaced by the organic layer 52 shown in FIG. 19.

The organic layer 52 is formed by periodic structuring, with air-filled voids in a polymer matrix. Such a layer may be obtained in the way for example described in United States patent application U.S. 2011/0222142.

Figure 20:
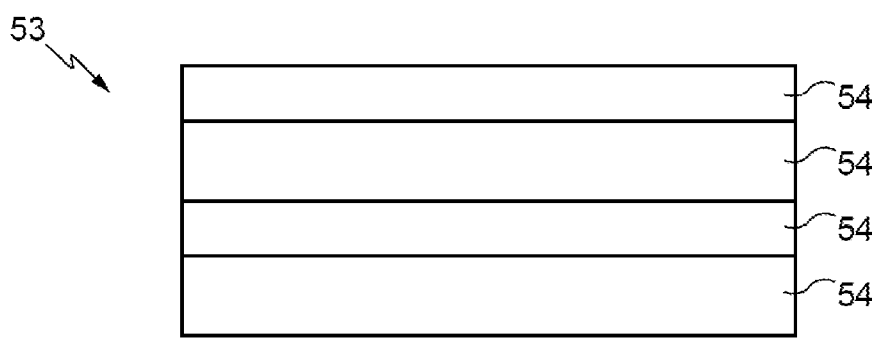
FIG. 20 shows the arrangement of another functional film configured to filter a relatively narrow preset band of wavelengths.

FIG. 20 shows another film 53 also configured to filter a relatively narrow preset band of wavelengths, but having an arrangement different from a thin supporting film on which an organic layer is deposited.

The film 53 is a multilayer optical film (MOF) obtained by stacking a plurality of organic films 54 of alternated refractive index.

Such a film may be obtained from the American company 3M or from the Japanese company DUPONT-TEIJIN, and is for example described in the U.S. Pat. No. 6,531,230, in international patent application WO 00/07046, in the U.S. Pat. No. 5,976,424, in international patent application WO 99/36248 and in the U.S. Pat. No. 6,117,530.

Figure 21:
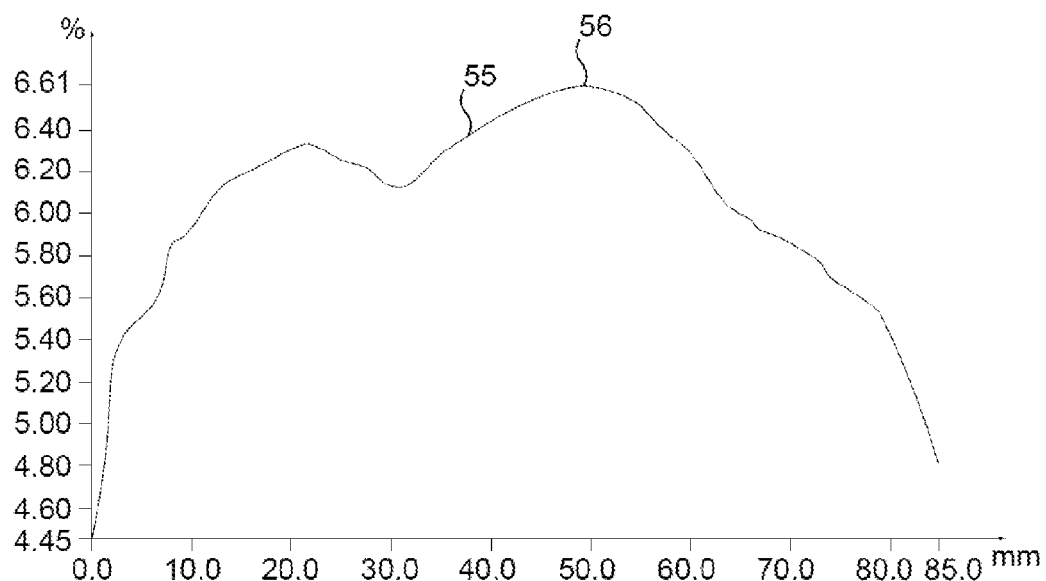
FIG. 21 is a similar graph to FIG. 16 but for a functional film arranged as shown in FIG. 20.

FIG. 21 is a graph similar to FIG. 14 or to FIG. 16, but for the film 53 shown in FIG. 20 after it has been glued to the curved face S1 of the substrate 31 in the same way as the film 32 shown in FIG. 15 (edge directly fixed by the ring such as 11).

By examining the curve 55 in FIG. 21, it may be seen that the peak 56 of this curve, i.e. the maximum degree of major deformation, is about 6.6%.

Figure 22:
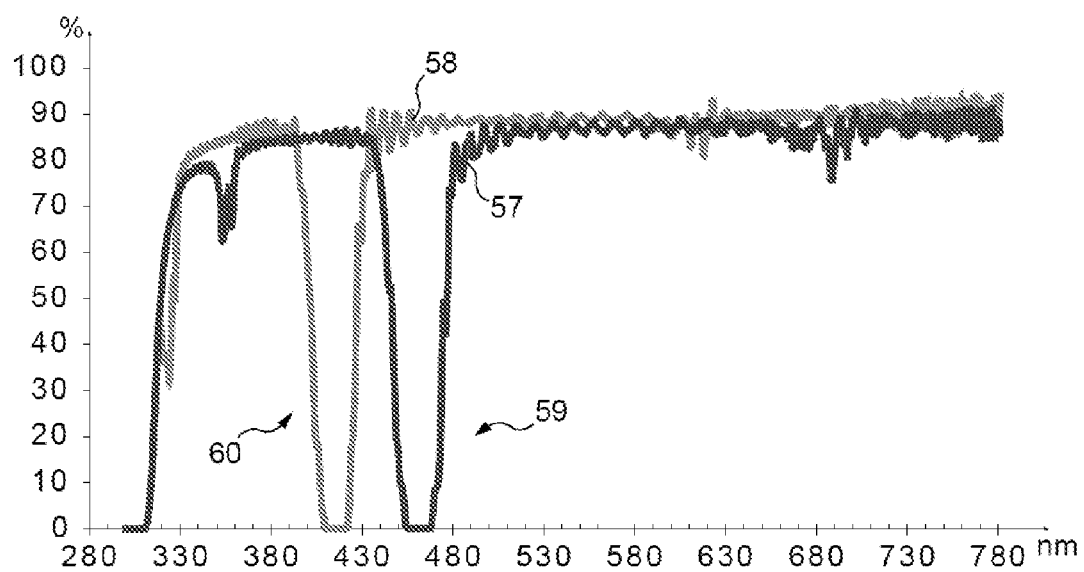
FIG. 22 is a similar graph to FIG. 17, for this other functional film.

FIG. 22 is a graph the x-axis of which represents wavelengths of light and the y-axis of which represents the degrees of transmission through a lens similar to the lens 30 shown in FIG. 9 but where the film 32 is replaced by the film 53 (method for gluing the film 53 implemented with a stratified structure such as 33) or through a similar lens comprising the film 53 glued in the same way as the film 32 shown in FIG. 15 (method for gluing the film 53 implemented with the film 53 held on its periphery).

The curve 57 (dark line) corresponds to the film 53 after it has been glued to the face S1 of a substrate 31 similar to that of the lens 30 in FIG. 9 using a gluing method implementing a stratified structure such as 33. The curve 58 (light line) corresponds to the film 53 which was glued to the curved face S1 in the same way as the film 32 shown in FIG. 15 (edge held directly).

It will be recalled here that, as described with regard to FIG. 21, the film 53 thus glued exhibits a maximum 56 degree of major deformation of about 6.6%.

It will be noted that, as regards the curve 57, the film 53 glued to the curved face S1 with implementation of a stratified structure such as 33, exhibits a maximum degree of major deformation of about 1%.

It will be noted that the curve 57 is identical or almost identical to the corresponding curve of the film 53 in the flat initial state.

As may be seen, the curve 57 comprises a peak 59 such that the film 53, after it has been glued to the curved face S1, confers on the lens of which it forms part the capacity to filter a relatively narrow band of wavelengths centered on the wavelength of 465 nm.

The wavelength exhibiting the maximum filtration is here 465 nm.

The degree of attenuation of the film 53 is here 100%.

The light filtered corresponding to the full width in wavelength at half-maximum of the peak 59 extends from about 445 nm to about 480 nm; and in this wavelength range the light transmission is lower than 50%.

It may also be seen that the curve 58 comprises a peak 60 such that the film 53, after it has been glued to the face S1, confers on the lens of which it forms part the capacity to filter a relatively narrow band of wavelengths centered on the wavelength of 420 nm.

It will be noted that the lenses described above, obtained with the film 32 or with the film 53, exhibit transmission curves the filtration maxima of which are uniform over the entirety of their area.

This is because:
either the observed degrees of major deformation are uniform over the useful area of the film, which area is defined by a large central portion of the functional film (FIGS. 16 and 21): the peripheral portion of the functional film, from 0 to 10 mm and from 70 to 85 mm in FIGS. 16 and 21 (and moreover in FIG. 14) will be removed from the lens inserted in the frame of the wearer;
or the observed degrees of major deformation are small (FIG. 14) and do not lead to modification of the spectral properties of the films (curves 42 and 57).

The lenses obtained by the method according to the invention exhibit a filtration maximum, at the centre of the lens, that differs by less than 5%, and preferably by less than 3%, from the maximum filtration on the periphery of the useful area of the lens.

It will be noted that all the deformation trials described above with reference to FIGS. 11 to 17, 21 and 22 were carried out with a curved face S1 of the substrate 31 that was convex and of radius of curvature of 85 mm (substrate having a base power of 6.25 dioptres if the refractive index of the substrate 31 is 1.53).

Other trials were carried out with substrates similar to the substrate 31 but having a curved face S1 of radius of curvature different from 85 mm.

Here, the trials were carried out with substrates the curved face of which was convex just like the face S1 and of radius of curvature in a range from 118 mm (base power of 4.5 dioptres) to 66 mm (base power of 8 dioptres).

These trials were carried out, on the one hand, using the gluing method implementing the stratified structure such as the structure 33, and on the other hand, using the gluing method in which the film is retained on its periphery by the ring 11, as explained especially with reference to FIGS. 15 and 16.

Figure 18:
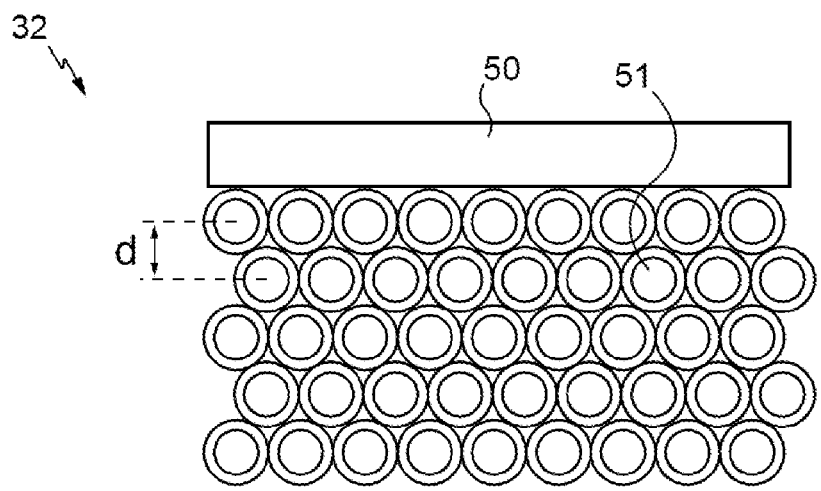
FIG. 18 is a schematic view explaining the arrangement of the functional film that comprises the lens in FIG. 9 or the lens comprising the film illustrated in FIG. 15 after it has been glued as indicated with regard to FIG. 16.

These trials were carried out with the film 32 arranged as shown in FIG. 18, and with the film 53 arranged as shown in FIG. 20.

Figure 23:
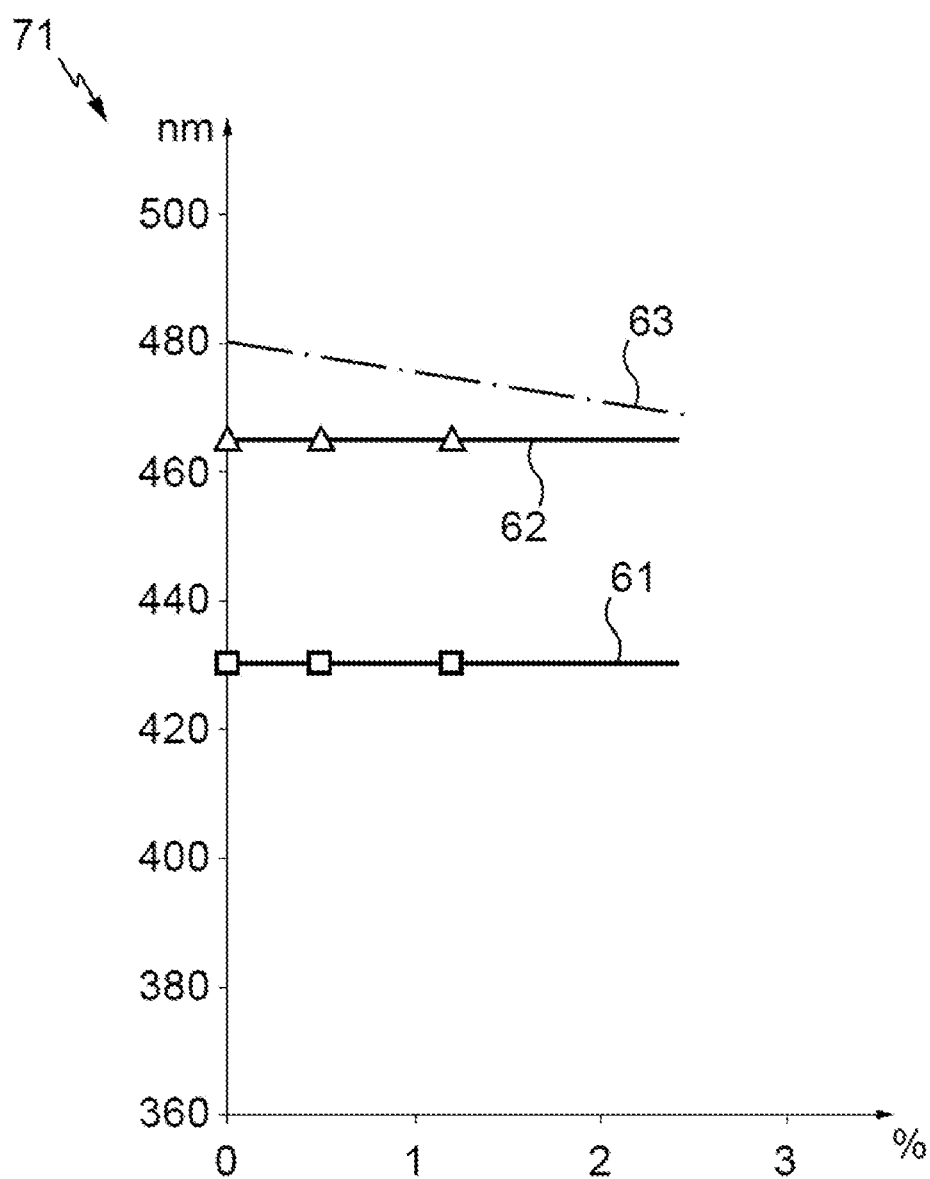
FIG. 23 is a graph containing curves each giving the wavelength (indicated on the y-axis) on which the filtration peak of a functional film is centered as a function of the maximum degree of major surface deformation experienced by this film (indicated on the x-axis), respectively a first curve corresponding to the functional film shown in FIG. 18; a second curve corresponding to the functional film shown in FIG. 20; and a third curve (dash-dot line) for an interferential filtering film that obeys Bragg's law.

For each of the gluing methods (with auxiliary membrane or with the film directly retained on its perimeter) and for various preforming-step temperature, pressure and duration parameters, the degrees of major deformation were noted for each of the curvatures, thereby allowing the graph 71 in FIG. 23 to be established.

This graph contains curves each giving the wavelength (indicated on the y-axis) on which the filtration peak of a functional film is centered as a function of the maximum degree of major surface deformation experienced by this film (indicated on the x-axis).

Generally, the results of these trials demonstrated that for certain organic interferential films, in particular interferential films with a three-dimensional order, such as photonic crystal filters, the arrangement of which is shown in FIGS. 18 and 19, a degree of major deformation smaller than 3% did not modify the transmission spectrum of the material, or, if it did so, it was only by a negligible amount.

It will be noted that it is particularly advantageous to implement this surprising effect whereby a shift in the peak of the transmission curve is absent or quasi-absent in the case where the degree of major deformation is smaller than 3%, more particularly smaller than 2% and even more specifically smaller than 1.5%.

The curve 61 corresponds to the functional film shown in FIG. 18. In this case, the threshold degree of major deformation for which the transmission spectrum of the material is not modified is comprised between 1.5% and 3%. This threshold is the degree of deformation value that separates the constant and decreasing sections of the curve 61. Its value is determined experimentally.

The curve 62 corresponds to the functional film shown in FIG. 20. In this case, the threshold degree of major deformation for which the transmission spectrum of the material is not modified is comprised between 1.5% and 2.5%.

The curve 63 corresponds to an interferential filtering film that obeys Bragg's law.

In other trials, in which the parameters of the preforming step were varied, thresholds comprised between 1.5% and 3% were observed.

Generally, as mentioned above, the invention also applies to an operation for gluing a functional film to a concave and/or convex face of an ophthalmic lens, the latter possibly having radii of curvature comprised, for example, between 350 mm and 53 mm, and a diameter, in the case of an ophthalmic lens of round geometry, comprised between 55 mm and 90 mm.

Many variants are possible depending on the circumstances, and it will be recalled, in this respect, that the invention is not limited to the examples described and shown.

The invention claimed is:

1. A method for manufacturing an ophthalmic lens comprising a substrate and a functional film securely fastened to a curved face (S1) of said substrate, comprising:
    obtaining the substrate comprising a curved face;
    obtaining the functional film, further defined as an interferential and organic filtering film; and
    gluing the functional film to the curved face in a manner such that a maximum degree of major deformation experienced by the film on a surface is less than 3%; wherein the functional film when securely fastened to the curved face is configured to filter a preset band of wavelengths.

2. The method of claim 1, wherein said functional film comprises a three-dimensional order or a one-dimensional order.

3. The method of claim 2, wherein the functional film comprises a three-dimensional order with an organic layer formed by photonic crystals.

4. The method of claim 2, wherein the functional film comprises a one-dimensional order with a multilayer or a plurality of organic films.

5. The method of claim 1, wherein said functional film at least partially filters light having a wavelength comprised between 400 nm and 460 nm.

6. The method of claim 5, wherein the functional film at least partially filters light having a wavelength comprised between 415 nm and 450 nm.

7. The method of claim 1, wherein said functional film filters at least 20% of light of wavelength comprised between 400 nm and 460 nm.

8. The method of claim 1, wherein the maximum of the degree of major deformation experienced by the film on a surface (S0) is lower than 3%.

9. The method of claim 1, wherein the maximum of the degree of major deformation experienced by the film on a surface (S0) is higher than 1%.

10. The method of claim 1, wherein the gluing method comprises steps of:
    i) preforming said functional film to give it a curvature;
    ii) bringing the centre of the convex face of said functional film into contact with the centre of the curved face (S1) of said substrate; and
    iii) then applying said functional film in order to diffuse radially from the centre of the film as far as its periphery the conformal contact between said film and said substrate.

11. The method of claim 10, wherein said steps i), ii) and iii) are implemented with said functional film, which forms part of a stratified structure comprising an auxiliary membrane and a binding layer between said functional film and said auxiliary membrane, only said auxiliary membrane being immobilized peripherally.

12. An ophthalmic lens comprising a substrate and a functional film securely fastened to a curved face (S1) of said substrate, said functional film being configured to filter a preset band of wavelengths in its initially flat state, wherein the wavelengths at which maximum filtration is observed at the centre of the lens and the wavelengths at which maximum filtration is observed at the periphery of the useful area of the lens differ by less than 5%.

13. The ophthalmic lens of claim 12, wherein the wavelengths at which said maxima are observed are each comprised between 400 nm and 460 nm.

14. The ophthalmic lens of claim 12, wherein each of said maximum filtrations is higher than 20%.

* * * * *